United States Patent
Nakajima et al.

(10) Patent No.: US 10,259,733 B2
(45) Date of Patent: Apr. 16, 2019

(54) LAUNDRY WASTEWATER BIOLOGICAL TREATMENT PREPARATION, AND DEVICE AND METHOD FOR TREATING LAUNDRY WASTEWATER BY USING SAME

(71) Applicant: MITSUBISHI HEAVY INDUSTRIES, LTD., Tokyo (JP)

(72) Inventors: Yuuji Nakajima, Tokyo (JP); Naoki Ogawa, Tokyo (JP); Kyoko Wada, Tokyo (JP); Yuta Nakatsuchi, Tokyo (JP); Atsushi Kinugasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 242 days.

(21) Appl. No.: 15/122,030

(22) PCT Filed: Nov. 20, 2014

(86) PCT No.: PCT/JP2014/080794
§ 371 (c)(1),
(2) Date: Aug. 26, 2016

(87) PCT Pub. No.: WO2015/145866
PCT Pub. Date: Oct. 1, 2015

(65) Prior Publication Data
US 2017/0015577 A1    Jan. 19, 2017

(30) Foreign Application Priority Data
Mar. 27, 2014    (JP) .................................. 2014-067276

(51) Int. Cl.
*C02F 3/12*        (2006.01)
*C02F 3/34*        (2006.01)
(Continued)

(52) U.S. Cl.
CPC .............. *C02F 3/348* (2013.01); *C02F 3/006* (2013.01); *C02F 3/12* (2013.01); *C02F 3/1205* (2013.01);
(Continued)

(58) Field of Classification Search
None
See application file for complete search history.

(56) References Cited

U.S. PATENT DOCUMENTS

2006/0134770 A1    6/2006  Miyako
2008/0308493 A1*  12/2008  Amir ...................... C02F 3/006
                                                                    210/610
(Continued)

FOREIGN PATENT DOCUMENTS

JP        6-277686 A      10/1994
JP        7-60276 A        3/1995
(Continued)

OTHER PUBLICATIONS

International Search Report dated Feb. 24, 2015, issued in counterpart International Application No. PCT/JP2014/080794 (2 pages).
(Continued)

*Primary Examiner* — Chester T Barry
(74) *Attorney, Agent, or Firm* — Westerman, Hattori, Daniels & Adrian, LLP

(57) ABSTRACT

The present invention includes: a laundry wastewater tank that temporarily stores laundry wastewater from a plant facility; a biological treatment tank in which the laundry wastewater from the laundry wastewater tank is aerated and mixed with activated sludge; a treated water tank that stores the treated laundry wastewater that has been biologically treated; and a treatment preparation supplying device that supplies a laundry wastewater biological treatment preparation to the biological treatment tank. The laundry wastewater (Continued)

biological treatment preparation is introduced when a change in water quality that deteriorates the biological treatment in the biological treatment tank is detected. Thus, biological treatment can be performed stably.

5 Claims, 17 Drawing Sheets

Specification includes a Sequence Listing.

(51) Int. Cl.
*C02F 3/00* (2006.01)
*C02F 103/00* (2006.01)

(52) U.S. Cl.
CPC .......... *C02F 3/34* (2013.01); *C02F 2103/002* (2013.01); *C02F 2209/005* (2013.01); *C02F 2209/008* (2013.01); *C02F 2209/08* (2013.01); *C02F 2307/12* (2013.01); *Y02W 10/15* (2015.05)

(56) References Cited

U.S. PATENT DOCUMENTS

| | | | | |
|---|---|---|---|---|
| 2010/0120651 A1* | 5/2010 | Dale | ................. | C11D 3/38609 510/224 |
| 2012/0152812 A1* | 6/2012 | Park | ..................... | C02F 3/1221 210/151 |
| 2012/0160767 A1 | 6/2012 | Okamura et al. | | |
| 2018/0022791 A1* | 1/2018 | Verheesen | ............. | A01N 63/02 |

FOREIGN PATENT DOCUMENTS

| | | |
|---|---|---|
| JP | 10-272480 A | 10/1998 |
| JP | 11-197686 A | 7/1999 |
| JP | 2000-51878 A | 2/2000 |
| JP | 2002-210486 A | 7/2002 |
| JP | 2005-278441 A | 10/2005 |
| JP | 2006-166874 A | 6/2006 |
| JP | 2007-260664 A | 10/2007 |
| JP | 2008-49283 A | 3/2008 |
| JP | 4334084 B2 | 9/2009 |
| WO | 2012/160526 A2 | 11/2012 |

OTHER PUBLICATIONS

Written Opinion of the Searching Authority dated Feb. 24, 2015, issued in counterpart International Application No. PCT/JP2014/080794 (4 pages).

Translation of Written Opinion dated Feb. 24, 2015, issued in counterpart Application No. PCT/2014/080794. (7 pages).

Extended (supplementary) European Search Report dated Apr. 13, 2017, issued in counterpart European Patent Application No. 14887132.0. (9 pages).

Translation of Written Opinion dated Feb. 2, 2015, issued in counterpart Application No. PCT/2014/080794. (7 pages).

* cited by examiner

<WITHOUT PROTECTIVE MATERIAL>

<WITH PROTECTIVE MATERIAL>

<BEFORE INITIATION OF ACCLIMATIZATION>

<AFTER COMPLETION OF ACCLIMATIZATION>

SEQUENCE LISTING

<160> NUMBER OF SEQ ID NOS: 11

<210> SEQ ID NO 1
<211> LENGTH: 17
<212> TYPE: DNA
<213> ORGANISM: Artificial Sequence
<220> FEATURE:
<223> OTHER INFORMATION: Forward Primer for SPG5

<400> SEQUENCE: 1
gtgcgtaacg cgtggga                                                    17

<210> SEQ ID NO 2
<211> LENGTH: 20
<212> TYPE: DNA
<213> ORGANISM: Artificial Sequence
<220> FEATURE:
<223> OTHER INFORMATION: Reverse Primer for SPG5

<400> SEQUENCE: 2
gtgtctcagt cccagtgtgg                                                 20

<210> SEQ ID NO 3
<211> LENGTH: 17
<212> TYPE: DNA
<213> ORGANISM: Artificial Sequence
<220> FEATURE:
<223> OTHER INFORMATION: Forward Primer for SPG6

<400> SEQUENCE: 3
ggtgcgtaac gcgtggg                                                    17

<210> SEQ ID NO 4
<211> LENGTH: 20
<212> TYPE: DNA
<213> ORGANISM: Artificial Sequence
<220> FEATURE:
<223> OTHER INFORMATION: Reverse Primer for SPG6

<400> SEQUENCE: 4
cgtgtctcag tcccagtgtg                                                 20

<210> SEQ ID NO 5
<211> LENGTH: 17
<212> TYPE: DNA
<213> ORGANISM: Artificial Sequence
<220> FEATURE:
<223> OTHER INFORMATION: Forward Primer for SPG7

<400> SEQUENCE: 5
gggtgcgtaa cgcgtgg                                                    17

<210> SEQ ID NO 6
<211> LENGTH: 20
<212> TYPE: DNA
<213> ORGANISM: Artificial Sequence
<220> FEATURE:
<223> OTHER INFORMATION: Reverse Primer for SPG7

<400> SEQUENCE: 6
ttcatcactc acgcggcatt                                                 20

<210> SEQ ID NO 7
<211> LENGTH: 16
<212> TYPE: DNA
<213> ORGANISM: Artificial Sequence

```
<220> FEATURE:
<223> OTHER INFORMATION: Forward Primer for SPG8

<400> SEQUENCE: 7
gcgcacgggt gcgtaa                                                    16

<210> SEQ ID NO 8
<211> LENGTH: 19
<212> TYPE: DNA
<213> ORGANISM: Artificial Sequence
<220> FEATURE:
<223> OTHER INFORMATION: Reverse Primer for SPG8

<400> SEQUENCE: 8
gtctcagtcc cagtgtggc                                                 19

<210> SEQ ID NO 9
<211> LENGTH: 19
<212> TYPE: DNA
<213> ORGANISM: Artificial Sequence
<220> FEATURE:
<223> OTHER INFORMATION: Forward Primer for SPG9

<400> SEQUENCE: 9
tggctcagaa cgaacgctg                                                 19

<210> SEQ ID NO 10
<211> LENGTH: 16
<212> TYPE: DNA
<213> ORGANISM: Artificial Sequence
<220> FEATURE:
<223> OTHER INFORMATION: Reverse Primer for SPG9

<400> SEQUENCE: 10
cgcgttacgc acccgt                                                    16

<210> SEQ ID NO 11
<211> LENGTH: 471
<212> TYPE: DNA
<213> ORGANISM: Artificial Sequence
<220> FEATURE:
<221> NAME/KEY: Consensus sequence
<222> LOCATION: (1)...(471)
<223> OTHER INFORMATION: Gene sequence that was obtained by obtaining
      consensus sequences (results of automatic production of consensus
      sequences using BIOEDIT), which were obtained from 16S rDNA gene
      alignment analysis of the microorganisms of the genus Sphingomonas
      and...
<220> FEATURE:
<221> NAME/KEY: Consensus sequence
<222> LOCATION: (1)...(471)
<223> OTHER INFORMATION: ...related genera, subsequently comparing these
      consensus sequences with the alignment results, and deleting the
      portions that needed to be deleted for having very low
      commonality.
<220> FEATURE:
<221> NAME/KEY: variation
<222> LOCATION: (66)...(66)
<223> OTHER INFORMATION: n is a, c, g, or t
<220> FEATURE:
<221> NAME/KEY: variation
<222> LOCATION: (132)...(132)
<223> OTHER INFORMATION: n is a, c, g, or t
<220> FEATURE:
<221> NAME/KEY: variation
<222> LOCATION: (133)...(133)
<223> OTHER INFORMATION: n is a, c, g, or t
<220> FEATURE:
<221> NAME/KEY: variation
<222> LOCATION: (155)...(155)
<223> OTHER INFORMATION: n is a, c, g, or t
```

```
<220> FEATURE:
<221> NAME/KEY: variation
<222> LOCATION: (385)...(385)
<223> OTHER INFORMATION: n is a, c, g, or t
<220> FEATURE:
<221> NAME/KEY: variation
<222> LOCATION: (407)...(407)
<223> OTHER INFORMATION: n is a, c, g, or t

<400> SEQUENCE: 11
agagtttgat chttggcgtc agaacgaacg ctggcggcat gcctaayaca tgcaagtcga      60
acgadnhctt cggdbbtagt ggcgcacggg tgcgtaacgc gtgggaatct rcccttkgst     120
dcggaataac hnnbdgaaay bdvwgctaat accgnatdat gwcbthvghc caaagattta    180
tcgscmavgg atgagcccgc gtargattag vtagttggtg rggtaaavgc bhaccaagsc    240
kacgatcytt agctggtctg agaggatgat cagccacact gggactgaga cacggcccag    300
actcctacgg gaggcagcag tdgggaatat tggacaatgg gcgvaagcct gatccagcaa    360
tgccgcgtga gtgatgaagg ccytngggth gtaaagctct tttaccngdg atgataatga    420
catacbggag aataagcycc ggctaactyc gtggcagcvg ccgcggtaat t             471
```

LAUNDRY WASTEWATER BIOLOGICAL TREATMENT PREPARATION, AND DEVICE AND METHOD FOR TREATING LAUNDRY WASTEWATER BY USING SAME

TECHNICAL FIELD

The present invention relates to a laundry wastewater biological treatment preparation that is used when, for example, working clothes of workers in plant facilities are washed using a biological treatment device, and a device and method for treating laundry wastewater using the biological treatment preparation.

BACKGROUND ART

Laundry wastewater or cleaning wastewater (hereinafter, representatively referred to as "laundry wastewater") that is discharged from, for example, plant facilities may include, for example, trace amounts of radioactive substances, as well as organic materials such as detergents, cloth fibers, fats and carbohydrates. In a wastewater treatment, these substances must be eliminated and made innocuous in order to satisfy effluent standard values.

Regarding conventional treatment methods for making laundry wastewater innocuous, there has been suggested a laundry wastewater treatment device capable of effectively treating laundry wastewater from a plant facility, by which laundry wastewater discharged from a plant facility is introduced into a biological treatment tank, the laundry wastewater is aerated and mixed with activated sludge therein, and a mixed liquid thus obtained is subjected to solid-liquid separation using a precision filtration membrane (PTL 1).

CITATION LIST

Patent Literature

[PTL 1] Japanese Unexamined Patent Application Publication No. 2002-210486

SUMMARY OF INVENTION

Technical Problem

However, the activated sludge operation monitoring in conventional biological treatments using activated sludge is based on the evaluation of wastewater treatment capacity, and for example, in the case of laundry wastewater, the wastewater treatment capacity depends on the value of the Chemical Oxygen Demand (COD). For example, in a COD-Mn method, which is an example of measurement of the COD value, it has been confirmed that for example, a COD-Mn of laundry water 300 ppm should be adjusted to a predetermined value of, for example, 20 ppm or lower.

Furthermore, the evaluation of activated sludge is carried out by means of indirect techniques such as those using the Mixed Liquor Suspended Solids (MLSS), oxygen consumption, and pH of activated sludge.

Therefore, in related art, there is no rapid evaluation technique available, which aims at implementing control of a biological treatment facility by using the individual performance of the microorganisms constituting the activated sludge used in a biological treatment.

As a result, it is the current situation that the activated sludge supplied to a wastewater treatment plant is operated in conditions of so-called "by the course of nature", and not necessarily a situation in which a sudden failure, and a decrease in the biological treatment capacity that is confirmed only after an elapse of several hours to several days therefrom (for example, if aeration is stopped due to power failure or the like, the biological treatment capacity is reduced; and if microorganisms are annihilated as a result of the incorporation of foreign materials or the like, the biological treatment capacity is reduced) are subjected to appropriate rapid countermeasures (for example, an increase or decrease in the amount of aeration, and reduction of the influent amount of wastewater). As a result, there has been a problem that the operation of biological treatment plants may be carried out unstably.

Furthermore, in a case in which a decrease in the biological treatment capacity has been confirmed, operators may not know how to cope with the situation, or which handling method is appropriate.

Therefore, there is an urgent demand for developing a technology which, in a case in which a decrease in the biological treatment capacity for laundry wastewater has been confirmed, can cope with the situation in order to rapidly restore the treatment capacity.

In view of such circumstances, it is an object of the present invention to provide a laundry wastewater biological treatment preparation, and a device and a method for treating laundry wastewater using the same.

Solution to Problem

A first invention of the present invention to solve the problems described above is a laundry wastewater biological treatment preparation that is added to an activated sludge for treating laundry wastewater that has been used to wash used clothing of plant workers or used cloth, the laundry wastewater biological treatment preparation being a freeze-dried sludge formed by freeze-drying a laundry wastewater-acclimatized activated sludge that has been acclimatized using the laundry wastewater described above.

A second invention is the laundry wastewater biological treatment preparation according to the first invention, in which the freeze-dried sludge includes the genus *Sphingomonas* and related genera thereof, all of which have sphingolipids in the surface layer of bacteria.

A third invention is the laundry wastewater biological treatment preparation according to the first or second invention, in which a protective agent is added to the freeze-dried sludge.

A fourth invention is a device for treating laundry wastewater, the device including a laundry wastewater tank that temporarily stores laundry wastewater from a plant facility; a biological treatment tank in which laundry wastewater from the laundry wastewater tank is aerated and mixed with activated sludge and biologically treated; a treated water tank that stores treated laundry wastewater that has been biologically treated; and a supplying device that supplies the laundry wastewater biological treatment preparation according to any one of the first to third inventions, to the biological treatment tank.

A fifth invention is the device for treating laundry wastewater according to the fourth invention, further including a control device that introduces the laundry wastewater biological treatment preparation when a change in water quality that deteriorates the biological treatment in the biological treatment tank is detected.

A sixth invention is the device for treating laundry wastewater according to the fourth invention, further including a first COD measurement device that measures the COD in the laundry wastewater tank; and a control device that introduces the laundry wastewater biological treatment preparation into the biological treatment tank based on measurement results of the first COD measurement device.

A seventh invention is the device for treating laundry wastewater according to the fourth invention, further including a second COD measurement device that measures the COD in the treated laundry wastewater that has been biologically treated in the biological treatment tank; and a control device that introduces the laundry wastewater biological treatment preparation into the biological treatment tank based on measurement results of the second COD measurement device.

An eighth invention is the device for treating laundry wastewater according to the fourth invention, further including a bacterial flora analyzer that measures the genus *Sphingomonas* and related genera thereof in the biological treatment tank; and a control device that introduces the laundry wastewater biological treatment preparation based on measurement results of the bacterial flora analyzer.

A ninth invention is the device for treating laundry wastewater according to any one of the fourth to eighth inventions, further including means for extracting activated sludge from the biological treatment tank; and a freeze-drying device that freeze-dries the extracted activated sludge and thereby produces a laundry wastewater biological treatment preparation.

A tenth invention is the device for treating laundry wastewater according to the ninth invention, in which the laundry wastewater biological treatment preparation produced in the freeze-drying device is supplied to the supplying device.

An eleventh invention is a method for treating laundry wastewater, the method including introducing the laundry wastewater biological treatment preparation using the device for treating laundry wastewater according to the fourth invention, when a change in water quality that deteriorates the biological treatment in the biological treatment tank is detected.

A twelfth invention is the method for treating laundry wastewater according to the eleventh invention, in which the change in water quality that deteriorates the biological treatment of the biological treatment tank is determined by measuring the COD in the laundry wastewater tank.

A thirteenth invention is the method for treating laundry wastewater according to the eleventh invention, in which the change in water quality that deteriorates the biological treatment of the biological treatment tank is determined by measuring the COD in the treated laundry wastewater in the biological treatment tank.

A fourteenth invention is the method for treating laundry wastewater according to the eleventh invention, in which the change in water quality that deteriorates the biological treatment of the biological treatment tank is determined by measuring the genus *Sphingomonas* and related genera thereof in the biological treatment tank.

Advantageous Effects of Invention

According to the invention, by introducing a laundry wastewater biological treatment preparation when a change in water quality that deteriorates the biological treatment in a biological treatment tank of activated sludge is detected, the biological treatment can be stably carried out.

DESCRIPTION OF EMBODIMENTS

Hereinafter, suitable embodiments of the invention will be described in detail with reference to the attached drawings. The invention is not intended to be limited to these embodiments, and in a case in which there are a number of embodiments, the invention also includes a configuration of combining various embodiments.

Example 1

Figure 1:
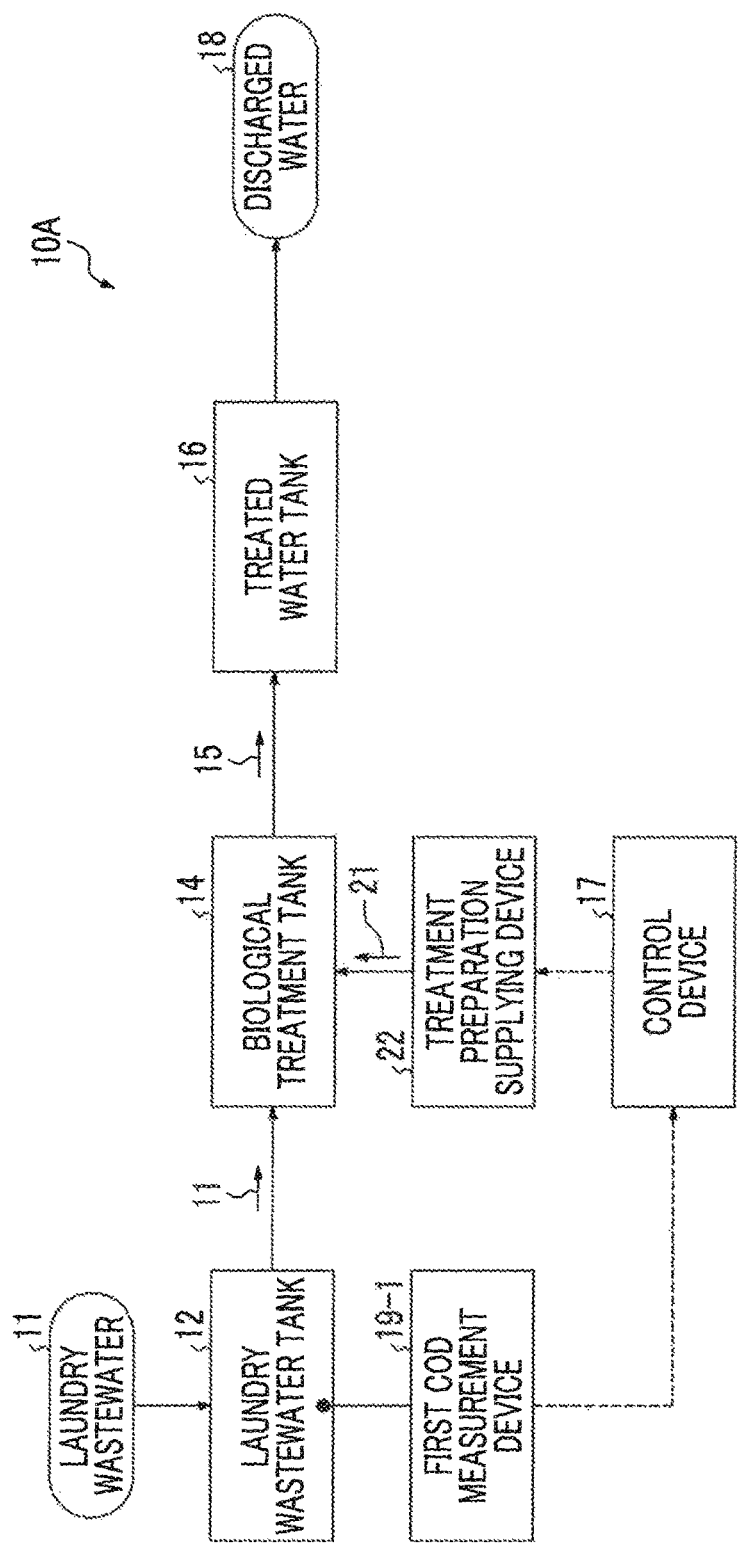
FIG. 1 is an outline diagram of a device for treating laundry wastewater related to Example 1.

FIG. 1 is an outline diagram of a device for treating laundry wastewater related to Example 1.

As illustrated in FIG. 1, a device for treating laundry wastewater 10A related to the present example is a device including a laundry wastewater tank 12 that temporarily stores laundry wastewater 11 from, for example, a plant facility such as a nuclear power facility; a biological treatment tank 14 in which the laundry wastewater 11 from this laundry wastewater tank 12 is aerated and mixed with activated sludge and is biologically treated; a treated water tank 16 that stores treated laundry wastewater 15 that has been biologically treated; and a treatment preparation supplying device 22 that supplies a laundry wastewater biological treatment preparation 21 to the biological treatment tank 14.

In the present example, a first COD measurement device 19-1 that measures the COD in the laundry wastewater tank 12 in order to detect a change in water quality that deteriorates the biological treatment, and a control device 17 that introduces a laundry wastewater biological treatment preparation 21 into the biological treatment tank 14, based on the measurement results of the first COD measurement device 19-1, are provided.

Furthermore, at the initiation of the biological treatment tank 14, a laundry wastewater biological treatment preparation 21 is introduced so as to accelerate acclimatization of activated sludge in the biological treatment tank.

Here, the laundry wastewater biological treatment preparation 21 of the present example is a laundry wastewater biological treatment preparation that is added to the sludge of the biological treatment tank 14 for treating laundry wastewater 11 that has been used to wash used clothing of plant workers or used cloth. The laundry wastewater biological treatment preparation 21 is a freeze-dried sludge that is formed by freeze-drying a laundry wastewater-acclimatized activated sludge 13 that has been acclimatized using laundry wastewater 11.

It is particularly preferable that this freeze-dried sludge includes the genus *Sphingomonas* and related genera thereof, all of which have sphingolipids in the surface layer of the bacteria.

Examples of this genus *Sphingomonas* and related genera thereof include, but are not limited to, *Sphingomonas*, *Novosphingobium*, *Sphingobium*, and *Sphingopyxis*.

Furthermore, when the freeze-drying treatment is performed, a protective agent may be added so as to attempt protection of the freeze-dried sludge. Here, examples of the protective agent include, for example, glycerin, dimethyl sulfoxide, sodium glutamate, starch, and skimmed milk.

The freeze-drying treatment may be carried out by any known technique, and an example thereof will be described here.

First, a laundry wastewater-acclimatized activated sludge 13 is collected and centrifuged using a centrifuge device (for example, 3,000 rpm for 10 minutes).

Next, a precipitate is weighed and transferred to a container for freeze-drying.

Thereafter, the precipitate is subjected to a freeze-drying treatment overnight at −20° C.

In a case in which a protective agent is used, a predetermined amount (for example, 1% to 10%) of the protective agent is introduced into the activated sludge when the activated sludge is transferred to the container for freeze-drying.

Figure 2:
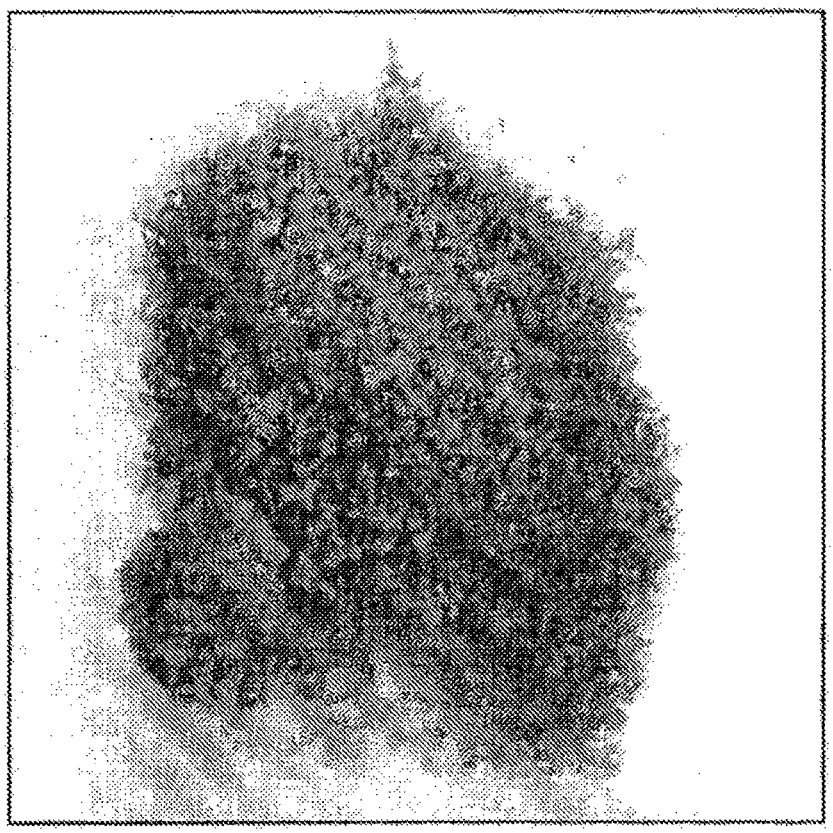
FIG. 2 is a photograph of freeze-dried sludge, to which no protective agent was added.
Figure 3:
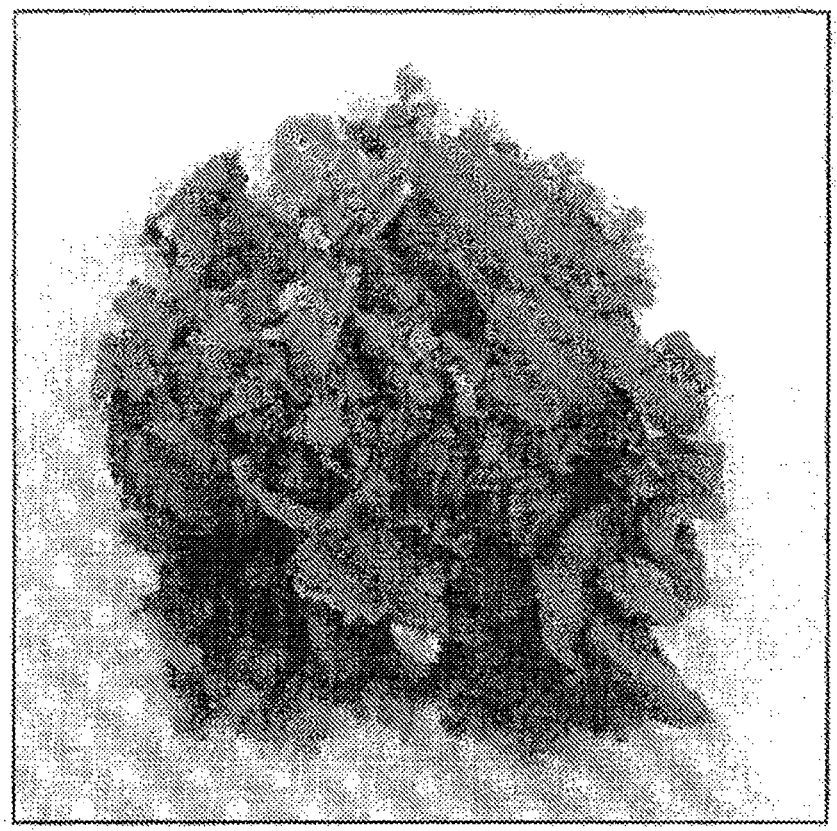
FIG. 3 is a photograph of freeze-dried sludge, to which a protective agent was added.

Photographs of a freeze-dried product are shown in FIG. 2 and FIG. 3.

FIG. 2 is a photograph of a freeze-dried sludge to which a protective agent has not been added, and FIG. 3 is a photograph of a freeze-dried sludge to which a protective agent was added.

These freeze-dried sludges that had been subjected to a freeze-drying treatment were both easily dispersible in water.

Figure 4A:
FIG. 4A is a photograph showing settleability of sludge before acclimatization.
Figure 4B:
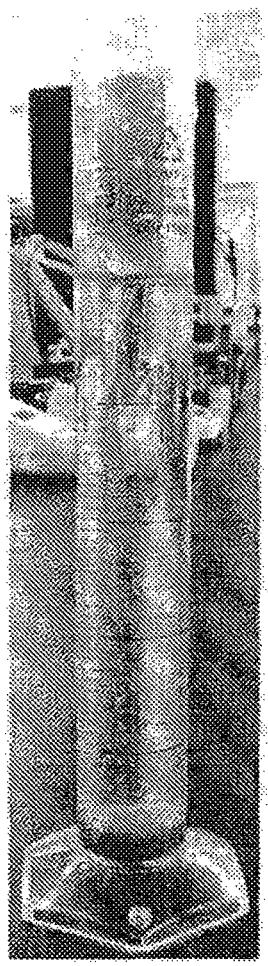
FIG. 4B is a photograph showing settleability of sludge after completion of acclimatization.

FIG. 4A and FIG. 4B are diagrams showing settleability of a freeze-dried sludge to which a protective agent has not been added.

FIG. 4A is a photograph showing the settleability of sludge before an acclimatization treatment, and FIG. 4B is a photograph showing the settleability of sludge after an acclimatization treatment.

Thereby, a freeze-dried sludge to which a protective agent had not been added, exhibited satisfactory settleability of the freeze-dried sludge after completion of acclimatization, compared to the settleability before the initiation of acclimatization.

As a result, since the sludge is not suspended, for example, in a case in which the activated sludge is introduced into a separation membrane, clogging of the separation membrane does not occur, which is preferable.

A wastewater treatment test was performed using this freeze-dried sludge.

Figure 5:
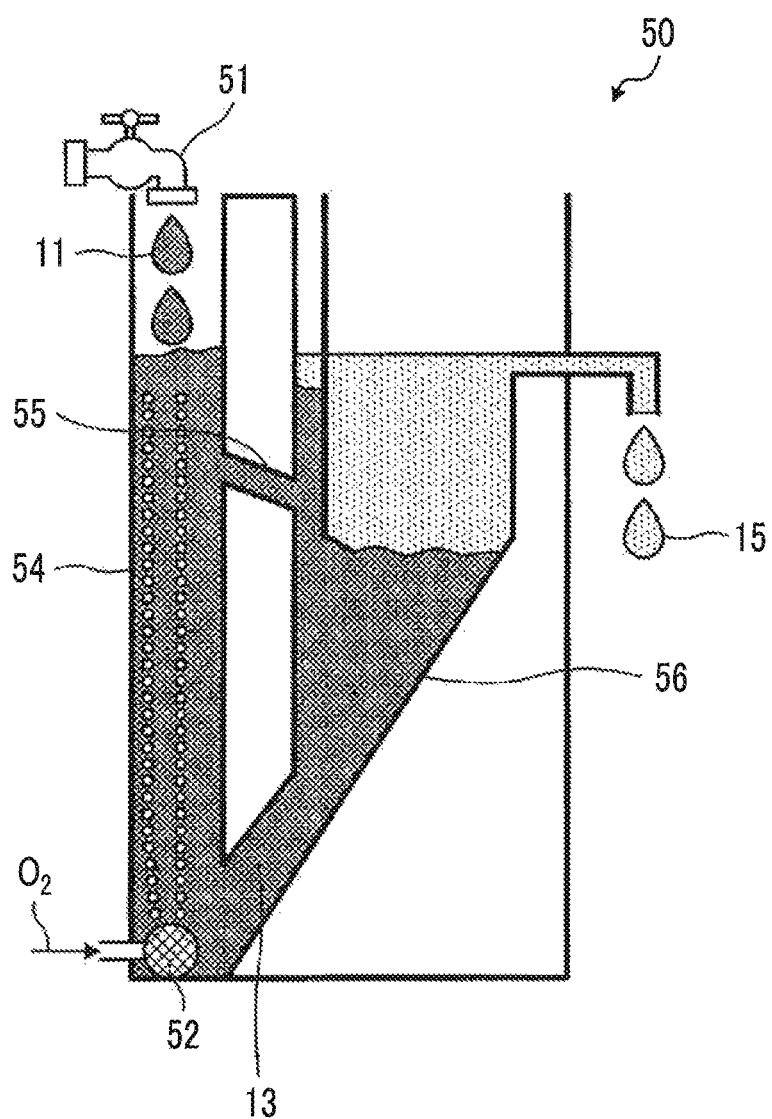
FIG. 5 is a diagram illustrating an example of a testing device for a wastewater treatment test.

FIG. 5 is a diagram illustrating an example of a testing device for a wastewater treatment test.

As illustrated in FIG. 5, a wastewater treatment testing device 50 includes an aeration unit 52 in which a predetermined amount of simulated laundry wastewater 11 is added from an addition unit 51, and oxygen ($O_2$) is supplied to the bottom. The wastewater treatment testing device 50 also includes an aeration tank 54 having activated sludge 13, and a settling tank 56 that is in communication with this aeration tank 54 through a communicating pipe 55 on the upper side, in which the activated sludge 13 is settled. Treated laundry wastewater 15 is discharged through the top of the settling tank 56.

Here, simulated laundry wastewater 11 was operated at pH 6.5 to 8.0 and at 25° C.

Regarding the simulated laundry wastewater, a mixture of $NH_4Cl$ (N component), $KH_2PO_4$ (P component), and a detergent (including cationic and nonionic surfactants) was used.

Figure 6:
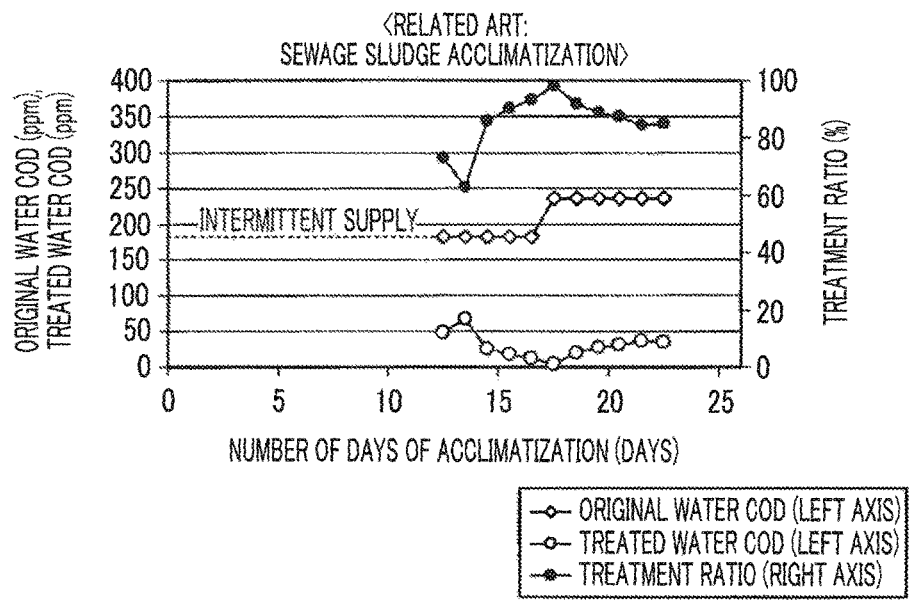
FIG. 6 is a diagram illustrating the relationship between the elapsed time (horizontal axis), the COD (left vertical axis; ppm), and the treatment ratio (right vertical axis; %) in an acclimatization treatment that uses a sewage seed sludge of related art.

FIG. 6 is a diagram illustrating the relationship between the elapsed time (horizontal axis), the COD (left vertical axis; ppm), and the treatment ratio (right vertical axis; %) in an acclimatization treatment using a sewage seed sludge of related art.

As in the case of related art, in a case in which sewage sludge is used and acclimatized, foaming occurs. Therefore, laundry wastewater with 180 ppm COD-Mn was used, and this was supplied intermittently. This operation was continued until foaming stopped.

In the present test, foaming continued for 12 days, and the initiation of acclimatization was on the $12^{th}$ day.

Therefore, laundry wastewater with 180 ppm COD-Mn could be continuously supplied from the $12^{th}$ day.

Also, since the COD concentration of the treated laundry wastewater 15 was below 20 ppm COD-Mn on the $17^{th}$ day, the laundry wastewater was supplied after raising the concentration of the supplied laundry wastewater 11 to 240 ppm COD-Mn.

However, as a result of the increase in the COD concentration, the COD concentration of the treated laundry wastewater 15 did not go below 20 ppm COD-Mn until 23 days elapsed.

On the contrary, in a case in which the freeze-dried sludge of the present example is used and acclimatized, shortening of the acclimatization time could be attempted.

Figure 7:
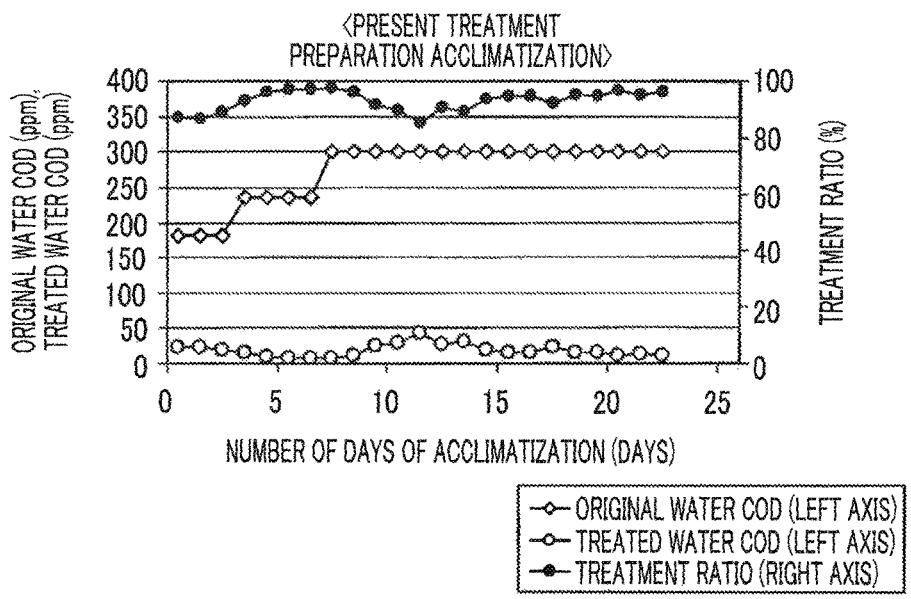
FIG. 7 is a diagram illustrating the relationship between the elapsed time (horizontal axis), the COD (left vertical axis; ppm), and the treatment ratio (right vertical axis; %) in an acclimatization treatment to which the freeze-dried sludge of the present example was added.

FIG. 7 is a diagram illustrating the relationship between the elapsed time (horizontal axis), the COD (left vertical axis; ppm), and the treatment ratio (right vertical axis; %), in an acclimatization treatment to which the freeze-dried sludge of the present example was added.

In a case in which freeze-dried sludge was used and acclimatized, in a case in which laundry wastewater with 180 ppm COD-Mn was used, the COD concentration of the treated laundry wastewater 15 could reach 20 ppm COD-Mn on the first day.

Therefore, the laundry wastewater 11 that was subsequently supplied was supplied after raising the concentration of the laundry wastewater 11 to 240 ppm COD-Mn. Even in this case, a COD concentration of 20 ppm COD-Mn of the treated laundry wastewater 15 could be continuously achieved, and therefore, the laundry wastewater 11 that was supplied on the $8^{th}$ day was supplied after increasing the COD concentration of the laundry wastewater 11 to 300 ppm COD-Mn.

When it is said that this COD concentration is 300 ppm COD-Mn, this is a load concentration for actual machine application. The COD concentration of the treated laundry wastewater 15 could reach 20 ppm COD-Mn on the $14^{th}$ day.

As a result, in a case in which freeze-dried sludge is supplied to the activated sludge tank, COD decomposition performance can be immediately expected.

Therefore, it was found that performing an acclimatization treatment for a long time period as in the case of performing an acclimatization treatment using seed sludge as in conventional cases, is unnecessary.

Furthermore, conventionally, in a case in which the COD concentration of laundry wastewater is, for example, above 300 ppm COD-Mn, it has been necessary to subject the laundry wastewater to a dilution treatment using a diluent before the laundry wastewater is introduced into a biological treatment tank. However, now, a buffer tank in which treatment water for such a dilution treatment is stored, or a dilution treatment is carried out, may be reduced, or even installation of a buffer tank becomes unnecessary.

Next, the composition ratios of principal microorganisms in the case of a conventional seed sludge treatment and in the case of using the freeze-dried sludge of the present example, in a case in which simulated laundry wastewater was used, were checked.

Figure 8:
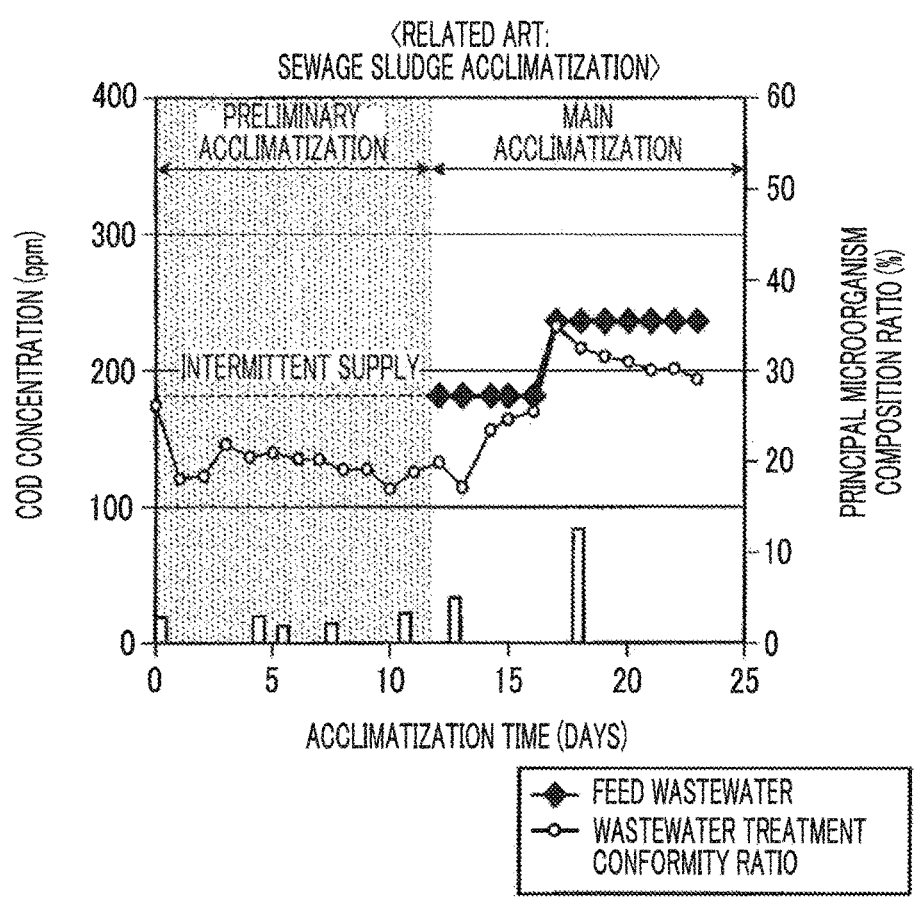
FIG. 8 is a diagram illustrating the compositional ratio of principal microorganisms in a sewage sludge acclimatization treatment of related art.

FIG. 8 is a diagram illustrating the compositional ratio of principal microorganisms in a sewage sludge acclimatization treatment of related art. Here, in FIG. 8, the bar graph represents the composition ratio (%) of principal microorganisms.

Here, the microorganisms to which attention was paid were the genus *Sphingomonas* and related genera thereof (*Novosphingobium*, *Sphingobium*, *Sphingopyxis*, and the like), and these will be described as principal microorganisms hereinafter.

In a preliminary acclimatization in which foaming occurred, the composition ratio of the principal microorganisms was several percent (%).

Thereafter, in a case in which main acclimatization was carried out, the composition ratio of the principal microorganisms increased to 5%, and in a case in which the COD concentration was increased to 240 ppm COD-Mn, the composition ratio of the principal microorganisms was only about 12%.

Furthermore, the conformity ratio (symbol ○ in the diagram) of the treated wastewater was also decreased, after the COD concentration was raised to 240 ppm COD-Mn in the main acclimatization.

Figure 9:
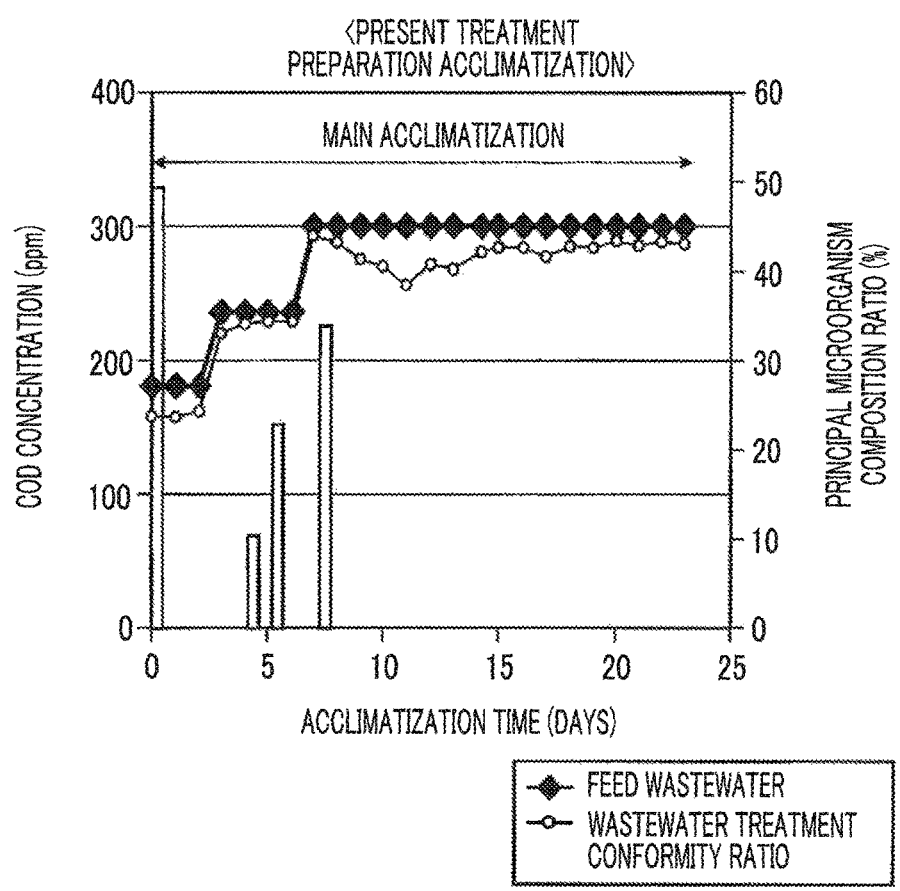
FIG. 9 is a diagram illustrating the compositional ratio of principal microorganisms in a sewage sludge acclimatization treatment carried out using a freeze-dried activated sludge.

FIG. 9 is a diagram illustrating the compositional ratio of principal microorganisms in a sewage sludge acclimatization treatment using freeze-dried activated sludge. Here, in FIG. 9, the bar graph represents the composition ratio of the principal microorganisms. As illustrated in FIG. 9, the composition ratio of the principal microorganisms increased synchronically with the treatment capacity.

Then, it was confirmed that the wastewater treatment capacity conformed to the input COD concentration from the $14^{th}$ day.

Figure 10:
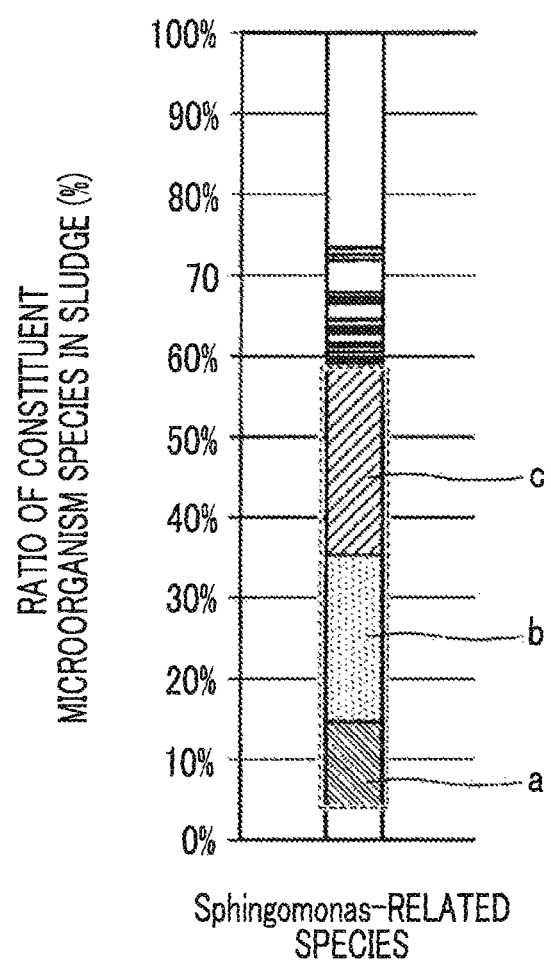
FIG. 10 is a diagram illustrating the results of a bacterial flora analysis for an activated sludge that has been used to treat laundry wastewater.
Figure 11:
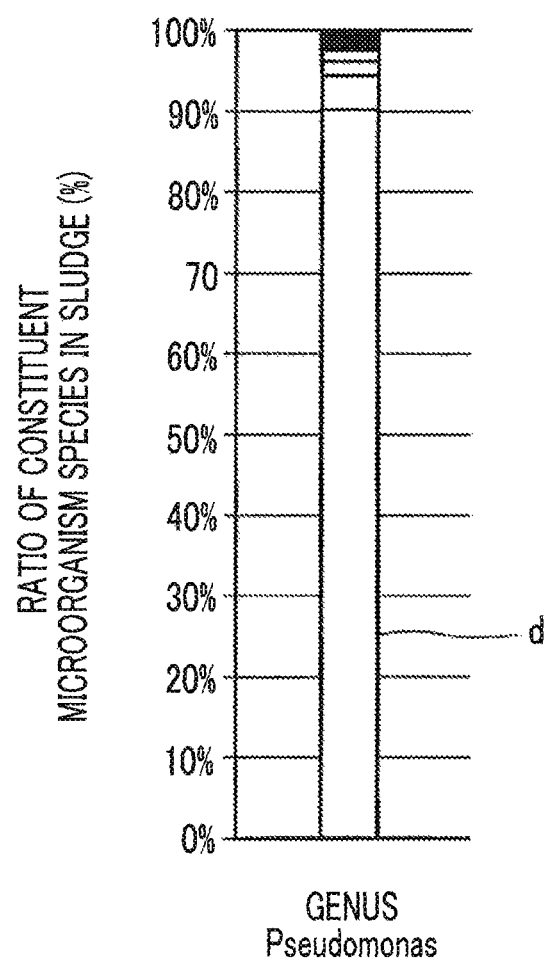
FIG. 11 is a diagram illustrating the results of a bacterial flora analysis for a commercially available microorganism preparation.

FIG. 10 is a diagram illustrating the results of a bacterial flora analysis for an activated sludge that has been used to treat laundry wastewater. FIG. 11 is a diagram illustrating the results of a bacterial flora analysis for a commercially available microorganism preparation.

As illustrated in FIG. 10, it was confirmed that three kinds of microorganisms of the genus *Sphingomonas* occupied about a half of the composition ratio.

Here, in FIG. 10, microorganism a represents *Sphingomonas*, microorganism b represents *Sphingobium*, and microorganism c represents *Sphingopyxis*.

In FIG. 11, in the commercially available microorganism preparation, microorganisms of the genus *Pseudomonas*, designated as microorganism d, occupied 90% of the composition ratio.

Figure 12:
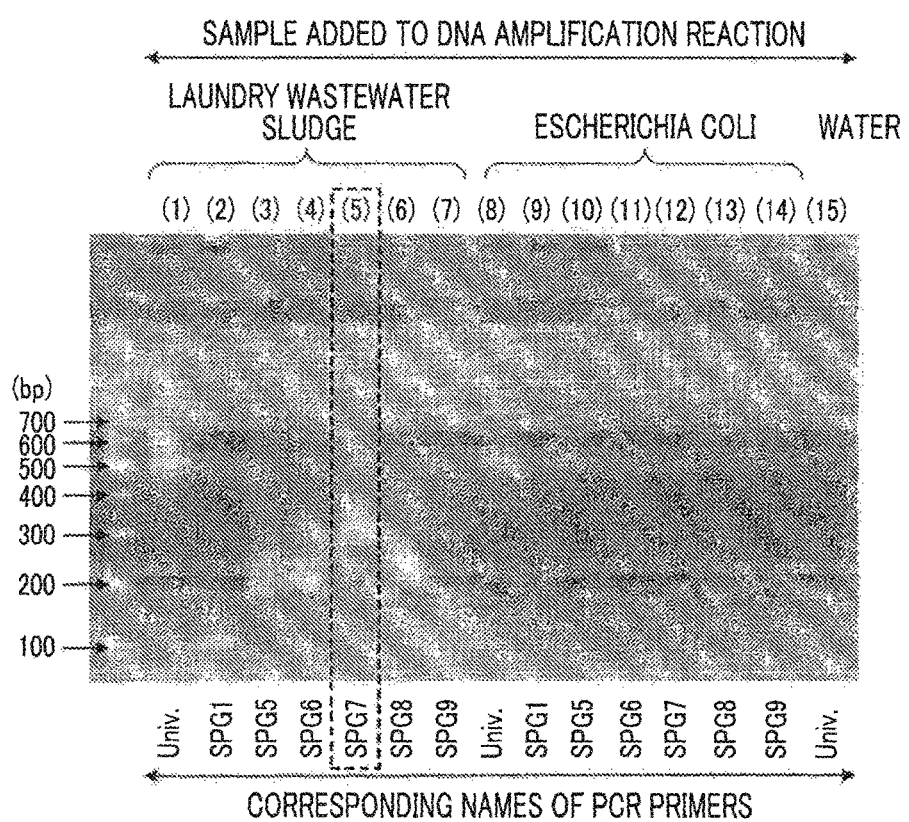
FIG. 12 is a diagram illustrating the results of a specificity identification test using a detection primer for detecting main activated sludge microorganisms using DNA for determination.

FIG. 12 is a diagram illustrating the results of a specificity identification test using a detection primer for the detection of the principal microorganisms of activated sludge for laundry wastewater using a DNA for determination.

Table 1 shows the detection primers for the genus *Sphingomonas* and related genera thereof (*Novosphingobium*, *Sphingobium*, and *Sphingopyxis*).

Table 2 shows forward primers and reverse primers of the detection primers (SPG5 to SPG9).

Table 3 shows a gene sequence that was obtained by obtaining consensus sequences (results of automatic production of consensus sequences using BIOEDIT), which were obtained from 16S rDNA gene alignment analysis of the microorganisms of the genus *Sphingomonas* and related genera, subsequently comparing these consensus sequences with the alignment results, and deleting the portions that needed to be deleted for having very low commonality.

A PCR primer for detection using these gene sequences (SPG7: underlined) are shown below.

TABLE 1

| Primer | Determination criteria | | |
|---|---|---|---|
| corresponding name | Evaluation of PCR product | PCR product length | Reaction with *Escherichia coli* |
| Univ. | | | B present |
| SPG1 | C | B 107 | B absent |
| SPG5 | B | B 205 | B absent |
| SPG6 | B | B 207 | B absent |
| SPG7 | A | B 292 | B absent |
| SPG8 | B | B 211 | B absent |
| SPG9 | C | B 87 | B absent |

TABLE 2

| Sequence No. | | Primer | Primer corresponding name |
|---|---|---|---|
| SEQ. ID NO: 1 | F1 | GTGCGTAACGCGTGGGA | SPG5 |
| SEQ. ID NO: 2 | R1 | GTGTCTCAGTCCCAGTGTGG | |
| SEQ. ID NO: 3 | F2 | GGTGCGTAACGCGTGGG | SPG6 |
| SEQ. ID NO: 4 | R2 | CGTGTCTCAGTCCCAGTGTG | |
| SEQ. ID NO: 5 | F3 | GGGTGCGTAACGCGTGG | SPG7 |
| SEQ. ID NO: 6 | R3 | TTCATCACTCACGCGGCATT | |
| SEQ. ID NO: 7 | F4 | GCGCACGGGTGCGTAA | SPG8 |
| SEQ. ID NO: 8 | R4 | GTCTCAGTCCCAGTGTGGC | |
| SEQ. ID NO: 9 | F5 | TGGCTCAGAACGAACGCTG | SPG9 |
| SEQ. ID NO: 10 | R5 | CGCGTTACGCACCCGT | |

(Base sequence 5' → 3')

TABLE 3

AGAGTTTGATCHTTGGCGTCAGAACGAACGCTGGCGGCATGCCTAAYAC

ATGCAAGTCGAACCADNHCTTCGGDBBTAGTGGCGCAC

<u>GGGTGCGTAACGCGTGGG</u>AATCTRCCCTTKGSTDCGGAATAACHNNBDG

AAAYBDVWGCTAATACCGNATDATGWCGTHVGHCCAAAGATTTATCGSC

MAVGGATGAGCCCGCGTARGATTAGVTAGTTGGTGRGGTAAAVGCBHAC

CAAGSCKACGATCYTTAGCTGGTCTGAGAGGATGATCACCCACACTGGG

ACTGAGACACGGCCCAGACTCCTACGGGAGGCAGCAGTDGGGAATATTG

GACAATGGGCGVAAGCCTGATCCAGC<u>AATGCCGCGTGAGTGATGAAG</u>

GCCYTNGGTHGTAAAGCTCTTTTACCNGDGATGATAATGACATACBGGA

GAATAAGCYCCGCTAACTYCGTGGCAGCVGCCGCGGTAATT

Lanes 1 to 7 show the cases in which laundry wastewater sludge was used, and Lanes 8 to 14 show the cases in which *Escherichia coli* was used. Lane 15 has water only.

A universal primer was used in Lane 1; SPG1 primer was used in Lane 2; SPG5 primer was in Lane 3; SPG6 primer was used in Lane 4; SPG7 primer was used in Lane 5; SPG8 primer was used in Lane 6; and SPG9 primer was used in Lane 7. Furthermore, a universal primer was used in Lane 8; SPG1 primer was used in Lane 9; SPG5 primer was used in Lane 10; SPG6 primer was used in Lane 11; SPG7 primer was used in Lane 12; SPG8 primer was used in Lane 13; SPG9 primer was used in Lane 14; and a universal primer was used in Lane 15.

Figure 13:
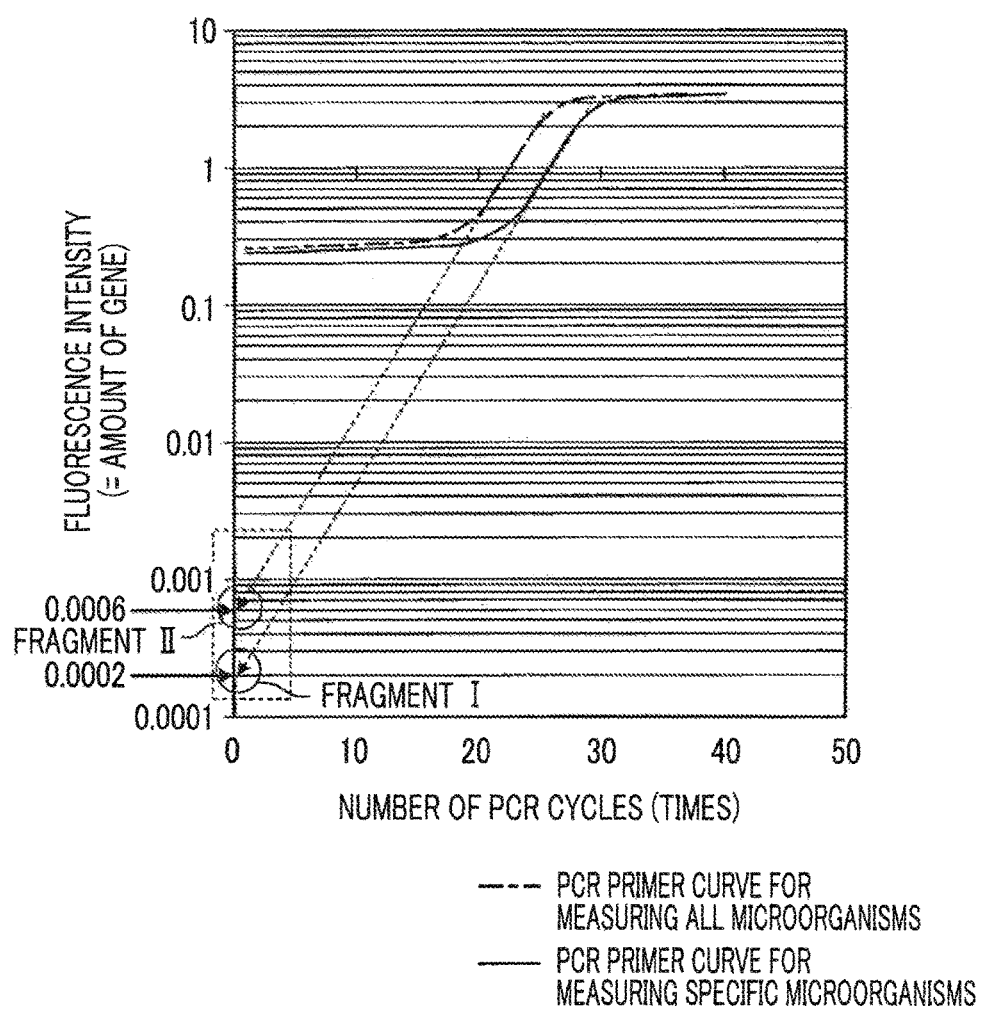
FIG. 13 is a diagram illustrating measurement of the principal microorganism ratio using real-time PCR.

FIG. 13 is a diagram showing the measurement results of the principal microorganism composition using real-time PCR.

A DNA amplification test was carried out in a real-time PCR device, using a universal primer that can amplify DNA in all kinds of microorganisms, and a specific primer that can amplify DNA in specific microorganisms (genus *Sphin-gomonas*, genus *Novosphingobium*, genus *Sphingobium*, and genus *Sphingopyxis*) only (SPG7 of Lane 5).

As shown in FIG. 13, the initial amounts of DNA are estimated (Fragment I and Fragment II) from an amplification curve for the PCR primer for analyzing specific microorganisms (solid line) and an amplification curve for the PCR primer for analyzing general microorganisms (dot-dash line), and the compositional ratio of principal microorganisms is calculated.

The calculation is based on the following:

Existence ratio (%)=DNA of specific microorganisms (Fragment I)/(DNA of all microorganisms (Fragment II)+1.4)×100=46.6%

Therefore, a bacterial flora analysis of the biological treatment tank 14 can be rapidly carried out using this real-time PCR device.

From the above results, in the present example, the treatment process in the biological treatment tank is not carried out such that activated sludge is acclimatized for a long time period using conventional seed sludge, but acclimatization can be carried out rapidly using freeze-dried sludge.

Regarding the case of applying this laundry wastewater biological treatment preparation 21 of freeze-dried sludge, the laundry wastewater biological treatment preparation 21 can be used at the time of starting up the biological treatment tank 14 prior to a wastewater treatment, instead of supplying conventional seed sludge.

Furthermore, during the operation, the treatment can be carried out while checking the COD concentration of the laundry wastewater 11.

In a case in which a plant has been stopped for a long time period, since the bacterial flora in the biological treatment tank 14 undergoes a change, at the time of start-up after this stoppage, the laundry wastewater biological treatment preparation 21 of the present example may be added to the biological treatment tank 14.

At this time, the laundry wastewater biological treatment preparation 21 may be supplied while inspecting the status of bacterial flora, by checking the bacterial flora in the biological treatment tank 14 using a bacterial flora device such as a real-time PCR device. The bacterial flora device has been explained using a real-time PCR device; however, the invention is not intended to be limited to this, and any known device that can analyze the status of bacterial flora can all be applied.

Furthermore, even in a case in which aeration has been brought to a stop due to power failure or the like, the situation can be rapidly coped with by adding the laundry wastewater biological treatment preparation 21 to the biological treatment tank 14.

As such, according to the present example, for example, in a case in which laundry wastewater that has been used for washing, for example, working clothes or used cloth in a nuclear facility or a general plant facility, is subjected to decomposition, a biological treatment can be stably carried out by introducing a laundry wastewater biological treatment preparation, when a change in water quality that deteriorates the biological treatment in a biological treatment tank of activated sludge is detected.

Example 2

Figure 14:
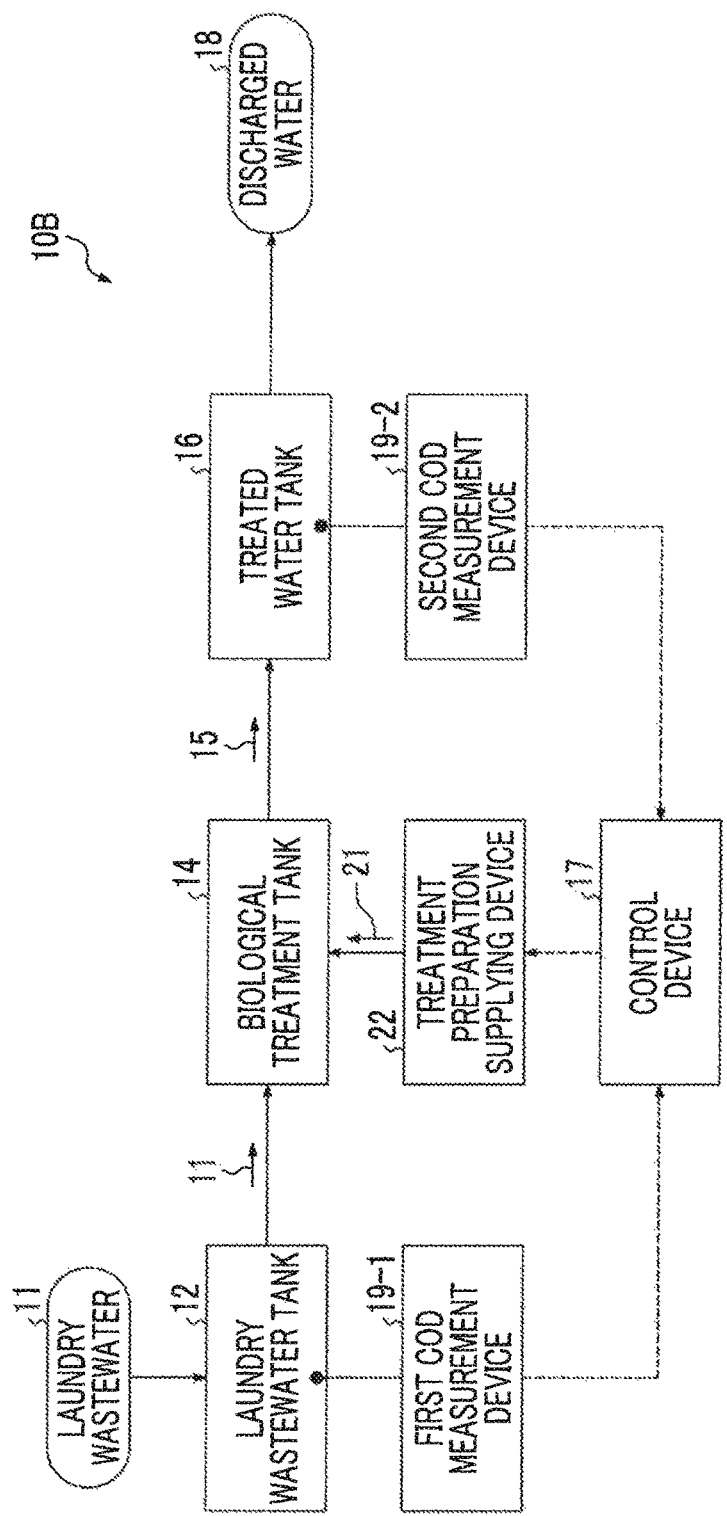
FIG. 14 is an outline diagram of a device for treating laundry wastewater related to Example 2.

FIG. 14 is an outline diagram of a laundry wastewater treatment device related to Example 2.

As illustrated in FIG. 14, in the laundry wastewater treatment device 10B related to the present example, a second COD measurement device 19-2 that measures the COD in the treated laundry wastewater 15 that has been biologically treated in the biological treatment tank 14 is further provided to the laundry wastewater treatment device 10A of Example 1, and the laundry wastewater biological treatment preparation 21 is introduced to the biological treatment tank 14 by a control device 17 based on the measurement results of the second COD measurement device 19-2.

As a result, conventionally, in a case in which the COD in the treated laundry wastewater 15 is higher than the standard value for discharged water 18 (for example, 20 ppm COD-Mn), there has been a need to separately dilute the laundry wastewater 11 that is supplied to the biological treatment tank 14. However, in the present example, since the situation can be coped with by supplying the laundry wastewater biological treatment preparation 21 to the biological treatment tank 14, such a dilution treatment as in conventional cases may be reduced, or may become unnecessary, and thus, reduction of the cost of initially facilities installation of plant and running equipment can be promoted.

Example 3

Figure 15:
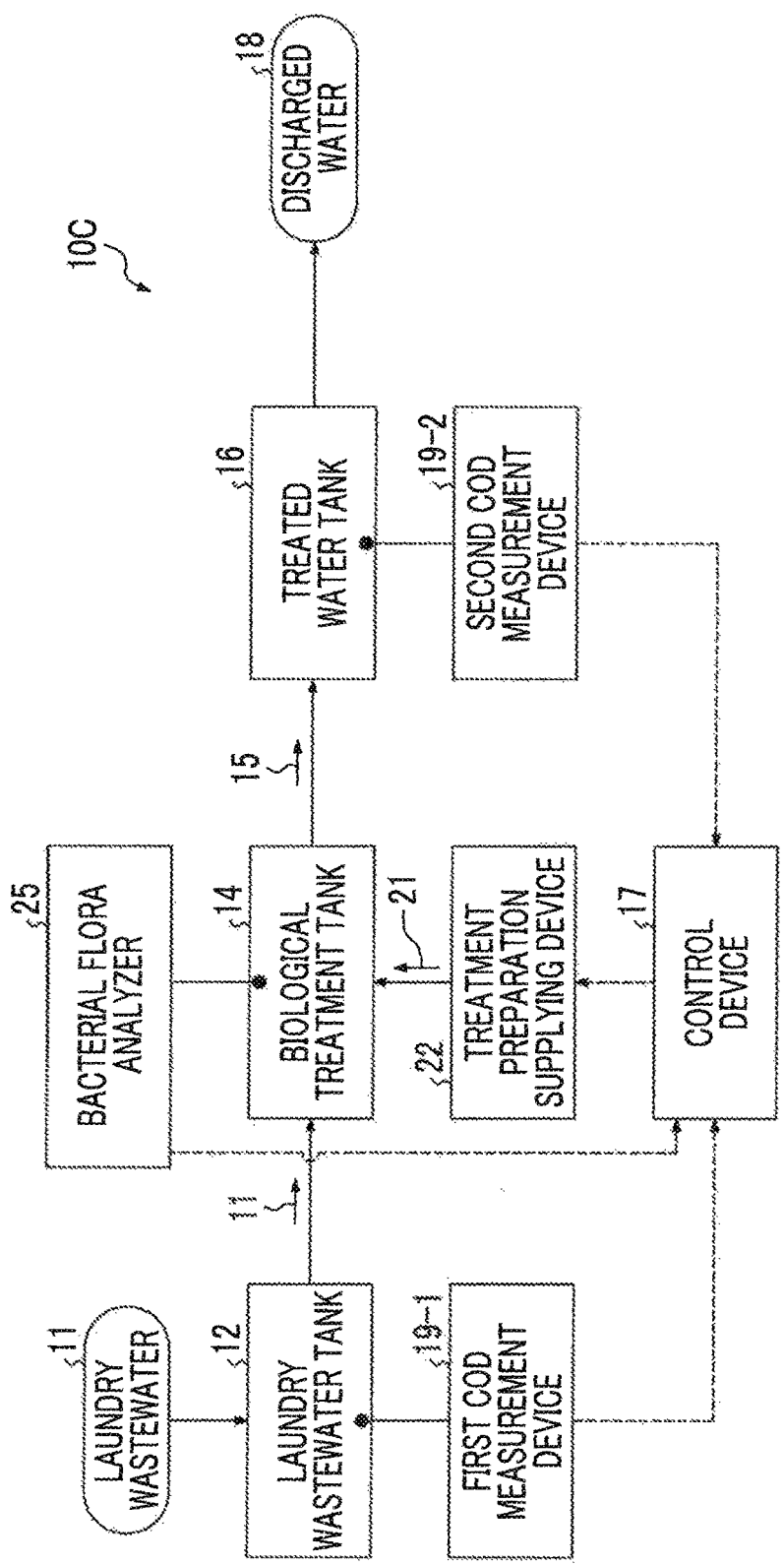
FIG. 15 is an outline diagram of a device for treating laundry wastewater related to Example 3.

FIG. 15 is an outline diagram of a laundry wastewater treatment device related to Example 3.

As illustrated in FIG. 15, in the laundry wastewater treatment device 10C related to the present example, a bacterial flora analyzer (for example, real-time PCR analyzer) 25 that analyzes the genus *Sphingomonas* and related genera thereof in the biological treatment tank 14 is further provided to the laundry wastewater treatment device 10B of Example 2. The laundry wastewater biological treatment preparation 21 is introduced into the biological treatment tank 14 by the control device 17 based on the analysis results of this bacterial flora analyzer (real-time PCR analyzer) 25, and the compositional ratio of principal microorganisms of the biological treatment tank 14 can be increased.

As a result, the problem of operating the device "by the course of nature" as in conventional cases is solved, and stable operation of a biological treatment plant is enabled.

Example 4

Figure 16:
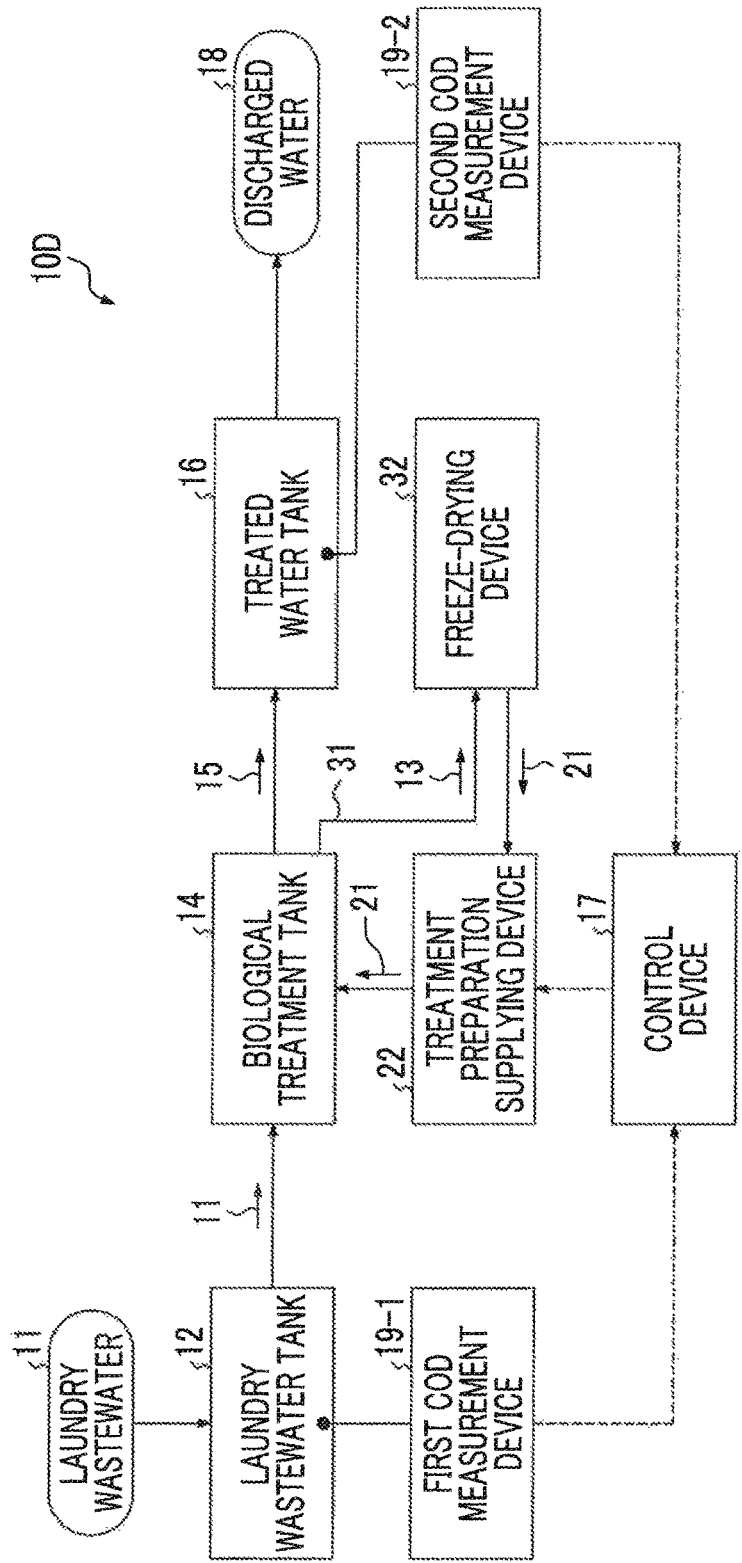
FIG. 16 is an outline diagram of a device for treating laundry wastewater related to Example 4.

FIG. 16 is an outline diagram of a laundry wastewater treatment device related to Example 4.

As illustrated in FIG. 16, in the laundry wastewater treatment device 10D related to the present example, an extraction line 31, which is an extraction means for extracting activated sludge 13 from the biological treatment tank 14, and a freeze-drying device 32 that freeze-dries this extracted activated sludge 13 and produces a laundry wastewater biological treatment preparation 21, are included in the laundry wastewater treatment device 10B of Example 2.

Thereby, the laundry wastewater biological treatment preparation 21 can be produced within a biological treatment plant facility, and if needed, the laundry wastewater biological treatment preparation 21 can be quickly supplied from a treatment preparation supplying device 22.

As a result, it is not necessary to stock a large amount of the laundry wastewater biological treatment preparation 21, and constantly stable operation of biological treatment plants is enabled.

Example 5

Figure 17:
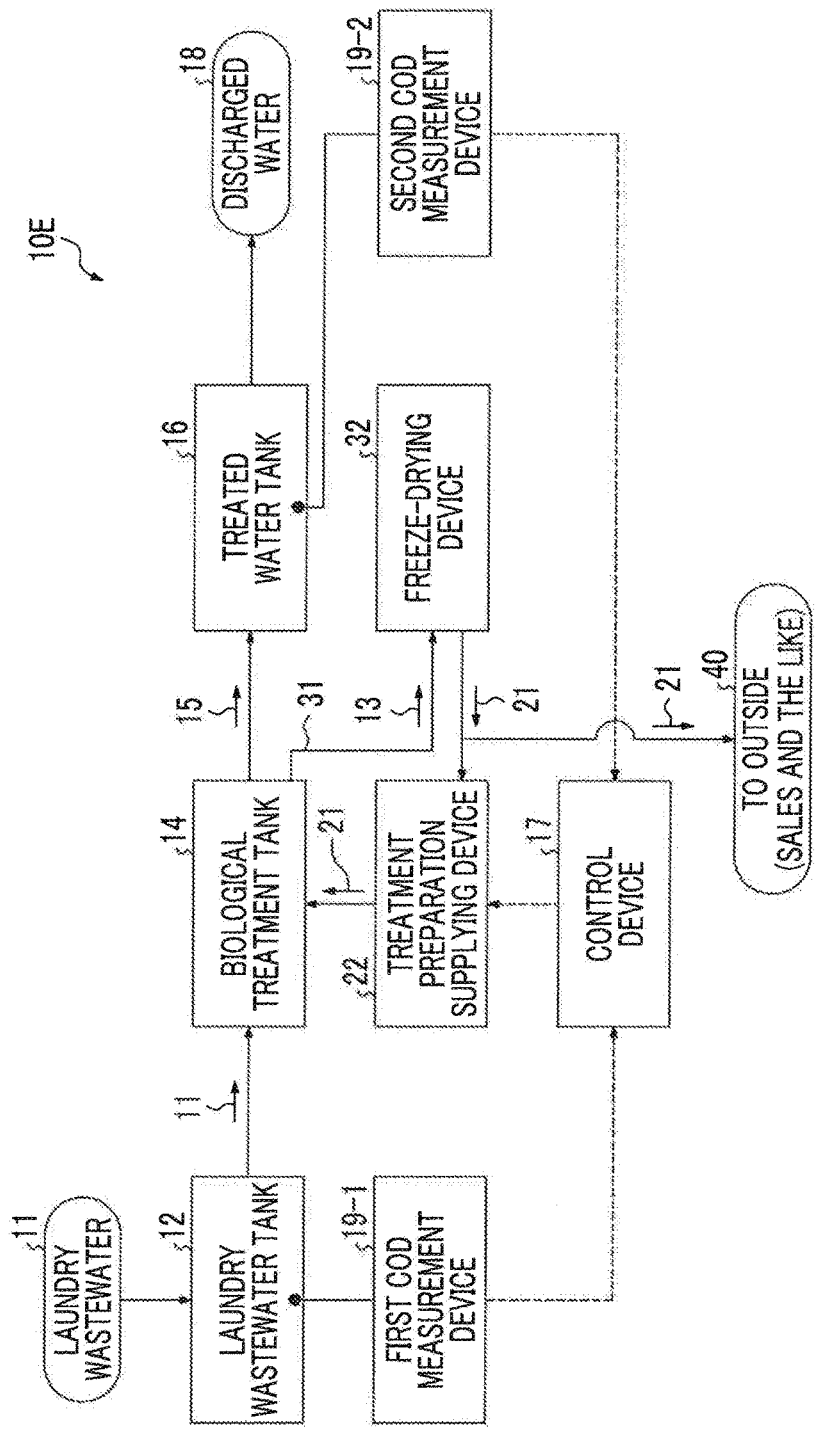
FIG. 17 is an outline diagram of a device for treating laundry wastewater related to Example 5.

FIG. 17 is an outline diagram of a laundry wastewater treatment device related to Example 5.

As illustrated in FIG. 17, in the laundry wastewater treatment device 10E related to the present example, a freeze-drying device 32 that produces the laundry wastewater biological treatment preparation 21 by freeze-drying the extracted activated sludge 13 of the laundry wastewater treatment device 10D of Example 4, is provided, and this produced laundry wastewater biological treatment preparation 21 is used in a in-house plant and is also supplied to the outside 40 for sales and distribution.

The laundry wastewater biological treatment preparation 21 obtainable by this freeze-drying device 32 can be directly applied to similar laundry wastewater treatment biological treatment devices. Therefore, the preparation can be supplied to, for example, wastewater treatment plants in the outside, where a biological treatment is performed on laundry wastewater in which similar detergents (including cationic and nonionic surfactants) were used.

For example, in a case in which there is a demand for an urgent increase in the biological treatment performance (for example, stoppage of aeration in a biological treatment tank caused by power failure or the like), a technique of transporting activated sludge in the form of "sludge" by means of a vacuum truck or the like has been conventionally adopted. However, this transportation in the form of sludge has problems that 1) the personnel expenses and the cost for vehicle rental and the like increase; 2) during the summer season or the like, a chilling means and the like are needed at the time of conveyance, and in the case of long-distance transportation, there is also a need for an aeration treatment to be appropriately carried out, so that there is a high risk of deteriorating the sludge quality.

In this regard, since the laundry wastewater biological treatment preparation 21 obtainable by the freeze-drying device 32 has a reduced volume, and storage and transportation of the preparation are easily achieved, sludge can be supplied to other wastewater treatment plants where biological treatments are performed on wastewater in which similar detergents (including cationic and nonionic surfactants) have been used, at low cost with low risk.

REFERENCE SIGNS LIST 10A to 10E LAUNDRY WASTEWATER TREATMENT DEVICE
11 LAUNDRY WASTEWATER
12 LAUNDRY WASTEWATER TANK
13 ACTIVATED SLUDGE
14 BIOLOGICAL TREATMENT TANK
15 TREATED LAUNDRY WASTEWATER
16 TREATED WATER TANK
18 DISCHARGED WATER
19-1 FIRST COD MEASUREMENT DEVICE
19-2 SECOND COD MEASUREMENT DEVICE
21 LAUNDRY WASTEWATER BIOLOGICAL TREATMENT PREPARATION
22 TREATMENT PREPARATION SUPPLYING DEVICE
31 EXTRACTION LINE
32 FREEZE-DRYING DEVICE

The invention claimed is:

1. A device for treating laundry wastewater, comprising:
a laundry wastewater tank that temporarily stores laundry wastewater from a plant facility;
a biological treatment tank in which laundry wastewater from the laundry wastewater tank is aerated and mixed with activated sludge and is biologically treated;
a treated water tank that stores treated laundry wastewater that has been biologically treated;
a supplying device that supplies a laundry wastewater biological treatment preparation to the biological treatment tank;
a first COD measurement device that measures a COD of the laundry wastewater in the laundry wastewater tank;
a second COD measurement device that measures a COD of the treated laundry wastewater in the treated water tank;
a real-time PCR analyzer that analyzes a status of bacterial flora in the biological treatment tank; and
a control device that introduces the laundry wastewater biological treatment preparation into the biological treatment tank from the supplying device based on the measurement results by the first COD measurement device and the second COD measurement device and the analysis results by the real-time PCR analyzer.

2. The device for treating laundry wastewater according to claim 1, further comprising:
means for extracting activated sludge from the biological treatment tank; and
a freeze-drying device that freeze-dries the extracted activated sludge and thereby produces a laundry wastewater biological treatment preparation.

3. The device for treating laundry wastewater according to claim 2, wherein the laundry wastewater biological treatment preparation produced in the freeze-drying device is supplied to the supplying device.

4. A method for treating laundry wastewater, the method comprising measuring a COD of laundry wastewater in a laundry wastewater tank and treated laundry wastewater in a treated water tank and analyzing a status of bacterial flora in a biological treatment tank, using a first COD measurement device, a second COD measurement device and a real-time PCR analyzer, introducing a laundry wastewater biological treatment preparation into the biological treatment tank from a supplying device using a control device based on the measurement results and the analysis results thereof.

5. The method for treating laundry wastewater according to claim 4, wherein the laundry wastewater biological treatment preparation includes the genus *Sphingomonas* and related genera thereof, and a compositional ratio of the genus *Sphingomonas* and related genera thereof in the biological treatment tank is analyzed using the real-time PCR analyzer.

* * * * *